(12) United States Patent
Vicino et al.

(10) Patent No.: US 10,794,411 B2
(45) Date of Patent: Oct. 6, 2020

(54) CHILD PART INCLUDING A RETENTION MEMBER AS A SECONDARY RETENTION FEATURE

(71) Applicant: Ford Global Technologies LLC, Dearborn, MI (US)

(72) Inventors: Andrew Vicino, Greenvale (AU); Rodolf Estrada, Craigieburn (AU)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 16/215,814

(22) Filed: Dec. 11, 2018

(65) Prior Publication Data

US 2019/0211853 A1 Jul. 11, 2019

(30) Foreign Application Priority Data

Jan. 8, 2018 (CN) .................... 2018 2 0028594 U

(51) Int. Cl.
| | |
|---|---|
| *F16B 2/22* | (2006.01) |
| *B60R 13/02* | (2006.01) |
| *F16B 2/24* | (2006.01) |
| *F16B 5/12* | (2006.01) |
| *F16B 21/08* | (2006.01) |
| *F16B 5/06* | (2006.01) |

(52) U.S. Cl.
CPC ............... *F16B 2/22* (2013.01); *B60R 13/02* (2013.01); *B60R 13/0206* (2013.01); *F16B 2/24* (2013.01); *F16B 5/0664* (2013.01); *F16B 5/126* (2013.01); *F16B 21/086* (2013.01)

(58) Field of Classification Search
CPC ... F16B 2/22; F16B 2/24; B60R 13/02; B60R 13/0206
See application file for complete search history.

(56) References Cited

U.S. PATENT DOCUMENTS

| | | | | |
|---|---|---|---|---|
| 4,471,593 | A * | 9/1984 | Ragland | E04B 2/7403 52/489.2 |
| 4,652,192 | A | 3/1987 | Schaller | |
| 5,966,782 | A * | 10/1999 | Ishihara | F16B 5/0614 24/289 |
| 7,900,953 | B2 | 3/2011 | Slobodecki et al. | |
| 8,047,475 | B2 | 11/2011 | Fukumoto et al. | |
| 8,943,655 | B2 * | 2/2015 | Kabeya | B60R 11/0217 24/453 |
| 2005/0054229 | A1 * | 3/2005 | Tsuya | B60R 13/0206 439/280 |
| 2006/0222841 | A1 * | 10/2006 | Masumizu | B29C 45/14336 428/319.3 |

(Continued)

FOREIGN PATENT DOCUMENTS

| | | |
|---|---|---|
| CN | 202716815 U | 2/2013 |
| EP | 2557369 A2 | 8/2011 |
| WO | 2009132749 A1 | 11/2009 |

*Primary Examiner* — Robert Sandy
*Assistant Examiner* — Michael S Lee
(74) *Attorney, Agent, or Firm* — David Coppielle; Kolitch Romano LLP

(57) ABSTRACT

A child part to be connected to a parent part is provided. The child part includes a main panel, and a clip tower on a surface of the main panel. The clip tower includes a base to hold a clip and a retention member extending from the base at a direction away from the main panel and bending to form a sloped portion with an angle to the surface of the main panel.

12 Claims, 4 Drawing Sheets

(56) References Cited

U.S. PATENT DOCUMENTS

| | | | |
|---|---|---|---|
| 2007/0075531 A1* | 4/2007 | Tsuge | B60R 13/02 |
| | | | 280/730.2 |
| 2014/0132023 A1* | 5/2014 | Watanabe | B60R 13/0206 |
| | | | 296/37.12 |
| 2015/0322985 A1* | 11/2015 | Scroggie | F16B 19/008 |
| | | | 29/428 |
| 2016/0020000 A1* | 1/2016 | Doushita | F16B 21/086 |
| | | | 174/72 A |
| 2018/0026576 A1* | 1/2018 | Danning | H02S 20/23 |
| | | | 52/173.3 |
| 2018/0340563 A1* | 11/2018 | Line | B60N 2/682 |
| 2019/0048907 A1* | 2/2019 | Sugiyama | F16B 21/075 |
| 2019/0084499 A1* | 3/2019 | Pinon Perez | F16B 5/06 |
| 2019/0092251 A1* | 3/2019 | Okamoto | B60R 13/0206 |
| 2019/0162215 A1* | 5/2019 | Santillan Gutierrez | F16B 2/22 |

\* cited by examiner

CHILD PART INCLUDING A RETENTION MEMBER AS A SECONDARY RETENTION FEATURE

RELATED APPLICATION

This application claims the benefit of Chinese Patent Application No.: CN 201820028594.0 filed on Jan. 8, 2018, the entire contents thereof being incorporated herein by reference.

FIELD

The present disclosure relates to a child part including a retention member as a secondary retention feature in addition to a fastener connecting the child part to another part.

BACKGROUND

Some vehicle interior components are typically fixed and retained to their parent parts using clip towers with snapped-on clips. Such connection is illustrated in FIG. 1. A child part 2 is connected to a parent part 4 via a clip 6. The clip 6 is preassembled on a clip tower 8 attached to the child part 2. The clip tower 8 is linear at an insertion direction S. Once the clip 6 is pressed through an assembling hole 10 of the parent part 4, the clip 6 is restored to its normal state such that the child part 2 is connected to the parent part 4. If the clip 6 disengages along a direction opposite to the insertion direction S, the child part 2 would no longer be retained on the parent part 4. Thus, in cases where the child part could be subject to a higher-than-typical load, additional levels of retention may be required. To add further retention, fasteners such as screws/screw bosses, bolts/nuts or high retention snapped-on clips are used. The use of additional fasteners adds cost and complexity to the manufacturing and the assembling processes and may require design changes to both the child and parent parts. Higher-retention clips typically do not require system design changes but do require higher insertion and removal effort to assemble and disassemble the child part. Thus, there exists a need for a simple and cost-effective mechanism to connect a child part to a parent part.

SUMMARY

According to one aspect of the present disclosure, a child part is provided to be connected to a parent part. The child part comprises a main panel; and a clip tower on a surface of the main panel. The clip tower includes a base to hold a clip and a retention member extending from the base at a direction away from the main panel and bending to form a sloped portion with an angle to a plane substantially perpendicular to the main panel.

In one embodiment, the base may further include two pillars and a bracket between the pillar and configured to hold the clip and the retention member may extend from the pillars and the angle may be less than 90 degrees.

In another embodiment, the retention member may be sized such that it can be inserted into an assembling hole of the parent part and allow the clip to pass through the assembling hole at an insertion direction while it can be only separated from the parent part by a rotation and then translation at the direction opposing the insertion direction.

In another embodiment, the main panel, the base and the retention member may be integrally formed in an injection molding.

According to another aspect, a child part is provided to be connected to a parent part. The child part includes a main panel; and a clip tower disposed on a surface of the main panel. The clip tower includes a bracket to hold a clip, a pillar adjacent to the bracket and a retention member extending from the pillar and forming a sloped portion with an angle to a plane substantially parallel to the main panel.

In one embodiment, the retention member may be configured to retain the part to the parent part when the clip disengages from an assembling hole of the parent part.

In another embodiment, the retention member of the main panel may have a width at a direction perpendicular to a main surface of the bracket and a projection of the width of the retention member may be greater than a width of the assembling hole.

In another embodiment, the angle of the retention member to the plane substantially parallel to the main panel may be less than 90 degrees.

In another embodiment, the clip tower may include two pillars and the retention member may include two sloped portions and wherein the bracket may be disposed between the two pillars.

In another embodiment, the retention member may further include a cross bar connecting two ends of the sloped portions.

In another embodiment, the main panel and the clip tower are made from plastic and integrally formed in an injection molding.

In another embodiment, the child part may be made from plastic, metal, carbon fiber, carbon-fiber-reinforced polymer or composite According to another embodiment, a part assembly is provided. The part assembly comprises a parent part including an assembling hole; a child part including a main panel; and a clip tower disposed on a surface of the main panel and a clip snapped on the clip tower. The clip tower includes a bracket disposed between two pillars, and a retention member. The retention member includes two sloped portions extending from the two pillars, respectively and bending to form an angle with a plane substantially parallel to the main panel of the child part. The clip is configured to deform to pass the assembling hole and restore to its normal state after passing the assembling hole to connect the child part to the parent part.

In one embodiment, the angle of the retention member to the plane substantially parallel to the main panel of the child part may be less than 90 degrees.

In another embodiment, the retention member may further include a crossbar connecting two ends of the sloped portions.

In another embodiment, a projection of a width of the retention member at its extension direction from the pillars may be greater than a width of the assembling hole.

In another embodiment, the main panel and the clip tower of the child part are integrally formed in an injection molding.

In another embodiment, the child part may include a plurality of clip towers. The selected clip towers may be configured to have the retention members, and the retention members may be sloped substantially at the same direction.

In another embodiment, the child part may include a plurality of clip towers. All clip towers may have the retention member, and the retention members may be sloped substantially at the same direction.

In another embodiment, the main panel and the clip tower of the child part may be made from plastic and integrally formed.

In another embodiment, the child part may be made from plastic, metal, carbon fiber, carbon-fiber-reinforced polymer or composite.

The child part of the present disclosure includes a retention member as a secondary retention feature to add additional level of retention to a parent part. The retention member is integrally formed with the child part. As no additional fasteners are needed to satisfy a high load condition, the cost saving and reduction on assembling the parts can be achieved.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed child parts with a retention member as a secondary retention feature will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various child parts are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
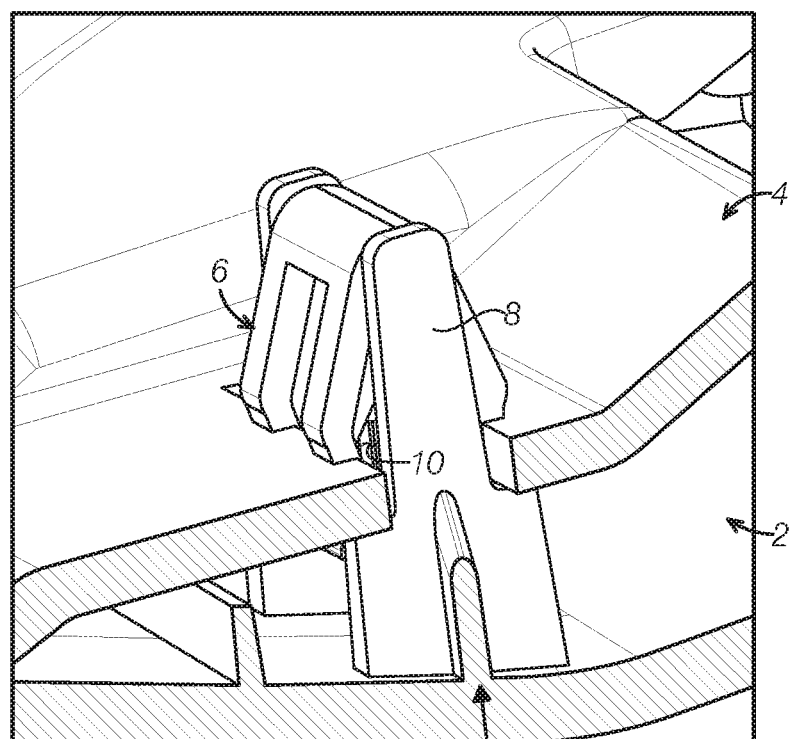
FIG. 1 illustrates a connection between two parts in prior art.
Figure 2:
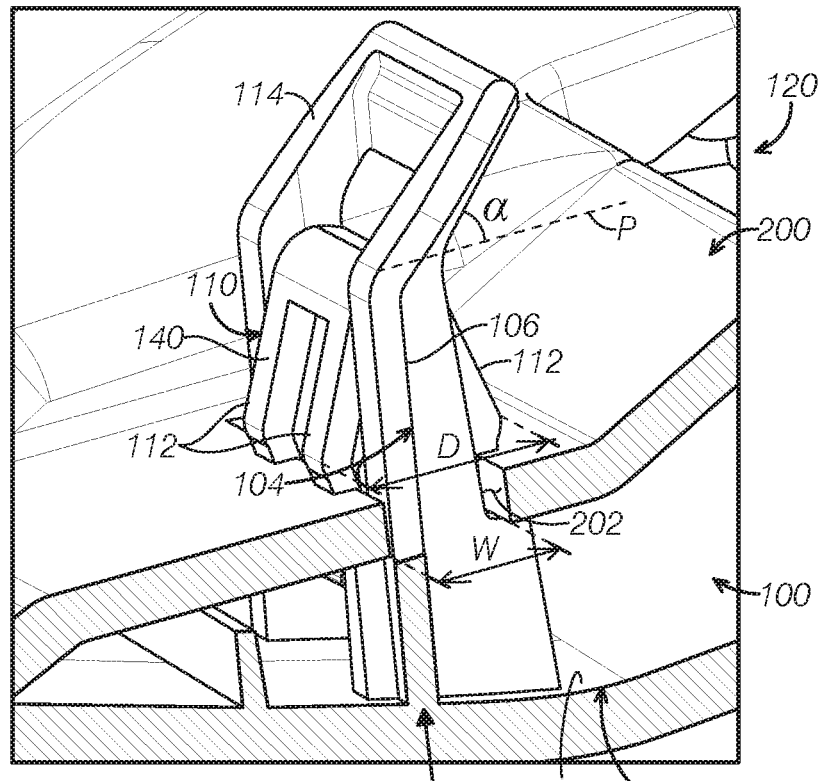
FIG. 2 is a perspective view of a part assembly according to one embodiment of the present disclosure, illustrating a connection between a child part and a parent part.

FIG. 2 is a perspective view of a part assembly 120 according to one embodiment of the present disclosure, illustrating a connection between a child part 100 and a parent part 200. The parent part 200 has an assembling hole 202.

The child part 100 includes a main panel 102 and a clip tower 104 attached to the main panel 102. The clip tower 104 includes a base 106, and a retention member 114. The retention member 114 extends from the base 106 and forms an angle α to a plane P substantially parallel to a surface 109 of the main panel 102. The surface 109 refers to a surface substantially perpendicular to an insertion direction S of inserting the child part 100 to the parent part 200. A clip 110 is snapped on or preassembled to the base 106 and has an elastic portion 112. The elastic portion 112 is configured to have a guide surface 140 to facilitate an insertion to the assembling hole 202 and has at least one-dimension D greater than a corresponding dimension W of the assembling hole 202. When the clip 110 preassembled on the clip tower 104 is inserted into the assembling hole 202 of the parent part 200, the elastic portion 112 is deformed to allow the clip 110 to pass through the assembling hole 202. At an assembled state shown in FIG. 2, the elastic portion 112 has been restored to its normal state and on the side of the parent part 200 that is away from the main panel 102 of the child part 100. As the clip 110 has the dimension D greater than the width W of the assembling hole 202 of the parent part 200, the child part 100 can be secured to the parent part 200.

Figure 3:
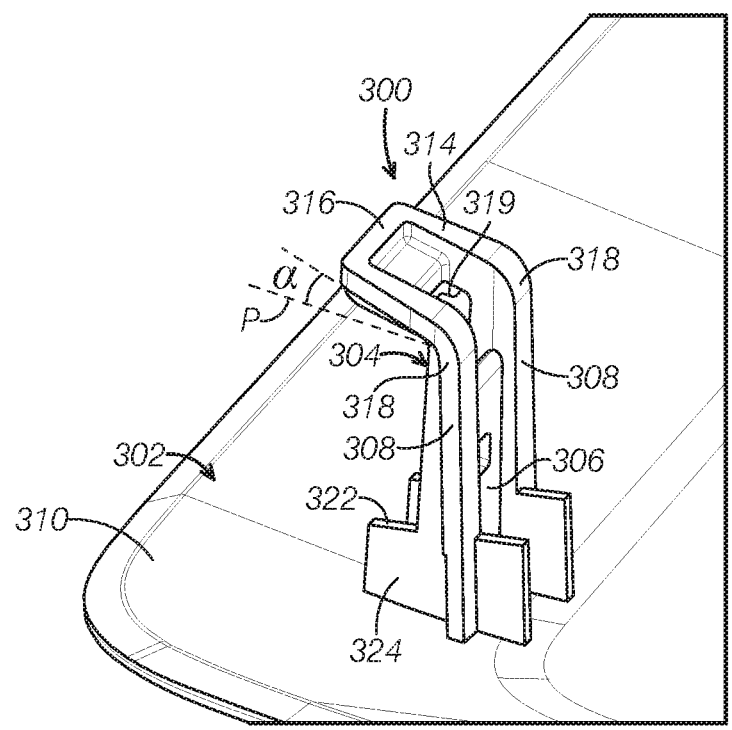
FIG. 3 is a perspective view of a child part according to one embodiment of the present disclosure.

In some embodiments, the clip tower 104 may further include a retention member 114 to provide a secondary retention feature in addition to the connection via the clip 110. The retention member 114 may extend from the base 106 and away from the main panel 102 and bended to form an angle α to the surface 109 of the main panel 102. The angle α may be greater than 0 and less than 90 degrees. The retention member 114 is configured to be hooked on the parent part 200 when the clip 110 slips through the assembling hole 202. In some embodiments, the angle α of the retention member is less than a threshold so that the clip tower 104 will not slip through the assembling hole 202 while allowing the clip tower 104 to pass the assembling hole 202 by rotation and translation movements during the assembling process. In one example, the threshold is about 60 degrees FIG. 3 is a perspective view of a child part 300 according to one embodiment of the present disclosure. The child part 300 includes a main panel 302 and a clip tower 304. The clip tower 304 may include a bracket 306 to hold a clip, a pillar 308 adjacent to the bracket 306 and a retention member 314. The retention member 314 extends from the pillars 308 and has an angle α to a plane P parallel to a surface 310 of the main panel 302. In the depicted embodiment, the clip tower 304 includes two pillars 308 and the bracket 306 is disposed between the two pillars 308. In some embodiments, the retention member 314 may include a cross bar 316 connecting with two ends 318 of the retention member 314. The cross bar 316 is spaced away from the pillars 308 when projected on the main panel 302 such that a space 319 is created for snapping the clip or preassembling the clip to the bracket 306. In some embodiments, the angle α of the retention member 314 may be in a range of greater than 0 and less than 90 degrees. In some embodiments, the angle α of the retention member is less than a threshold. It should be appreciated that the clip tower 304 may include one pillar 308 and one retention member 314 extending from the pillar 308.

The clip tower 304 may further includes two feet 322 extending from bottom portions 324 of the pillars 308. In the depicted embodiment, each foot 322 extends from the base in two directions opposing each other. The feet 322 are configured to contact and support a parent part at an assembled state.

In some embodiments, the main panel 302 and the clip tower 314 are made from plastic material and integrally formed in an injection molding. It should be appreciated that the child part according to the present disclosure may be made from other materials such as metal or carbon fiber, carbon-fiber-reinforced polymer or composite.

Figure 4:
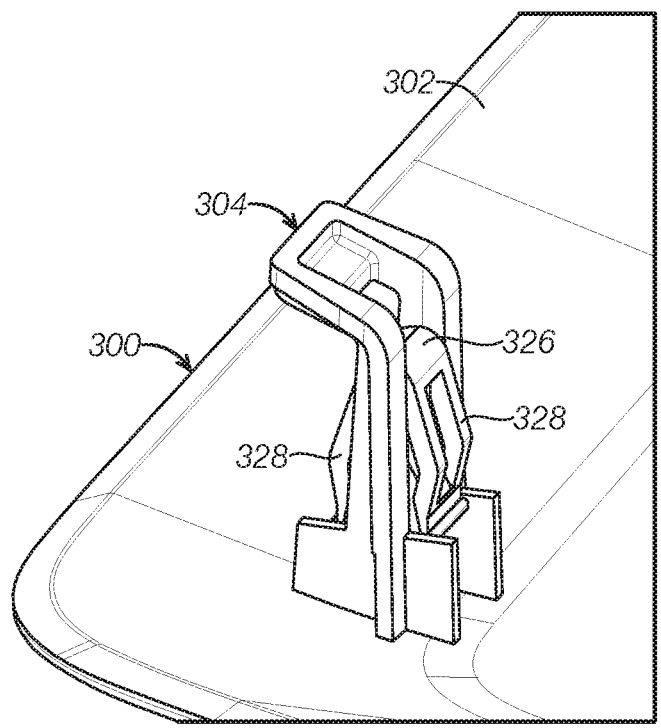
FIG. 4 is a perspective view of the child part in FIG. 3, illustrating the child part preassembled with a clip.

FIG. 4 is a perspective view of the child part 300 in FIG. 3, illustrating the child part 300 preassembled with a clip 326. The clip 326 is individually made. The clip 326 may be made from plastic material or other suitable material such as metal. In the depicted embodiment, the clip 326 has two elastic portions 328 cross to the bracket 306. The clip 326 can be preassembled on to the clip tower 304 by snapping on the bracket 306.

Figure 5:
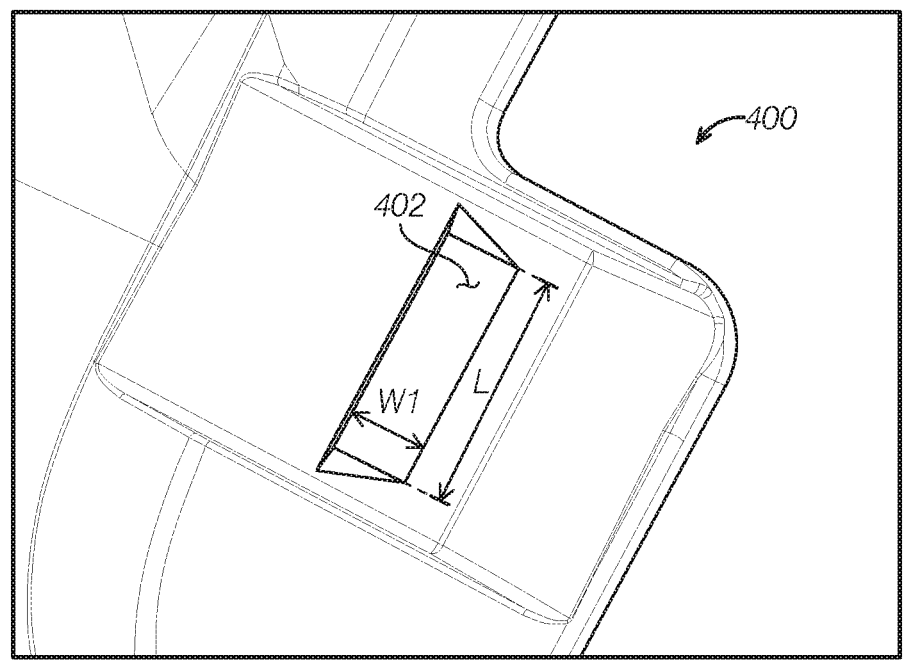
FIG. 5 is a partial perspective view of a parent part according to one embodiment of the present disclosure.
Figure 6:
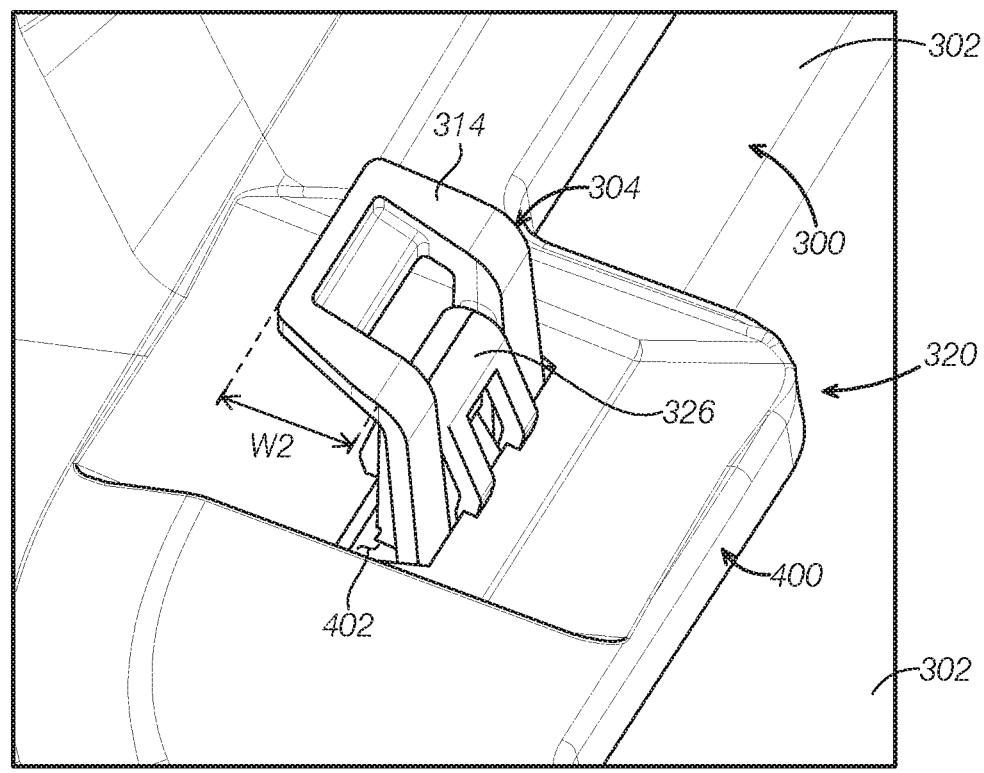
FIG. 6 is a partial perspective view of the child part in FIG. 4 and the parent part in FIG. 5, illustrating an assembled state.

FIG. 5 is a partial perspective view of a parent part 400 according to one embodiment of the present disclosure. FIG. 6 is a perspective view of a part assembly 320 including the child part 300 in FIG. 4 and the parent part 400 in FIG. 5, illustrating an assembled state. Referring FIGS. 5 and 6, the parent part 400 includes an assembling hole 402. The assembling hole 402 has an elongated shape having a length L1 and a width W1. The clip tower 304 with the clip 326 snapped on the clip tower 304 has passed the assembling hole 402 in FIG. 6. The clip 326 functions as a primary retention to connect the child part 300 to the parent part 400. The retention member 314 functions as a secondary retention. The retention member 314 has a width and a projection width W2 of the retention member 314 on the main panel 302 of the child part 300 is greater than the width W1 of the assembling hole 402. In other words, the projection width W2 of the retention member at its extension direction from the pillars is greater than the width W1 of the assembling hole 402. Thus, the retention member 314 is hooked on the panel of the parent part 400 even if the clip 326 slip off the assembling hole 402 at a linear direction or a direction opposing an insertion direction during the assembling.

Figure 7:
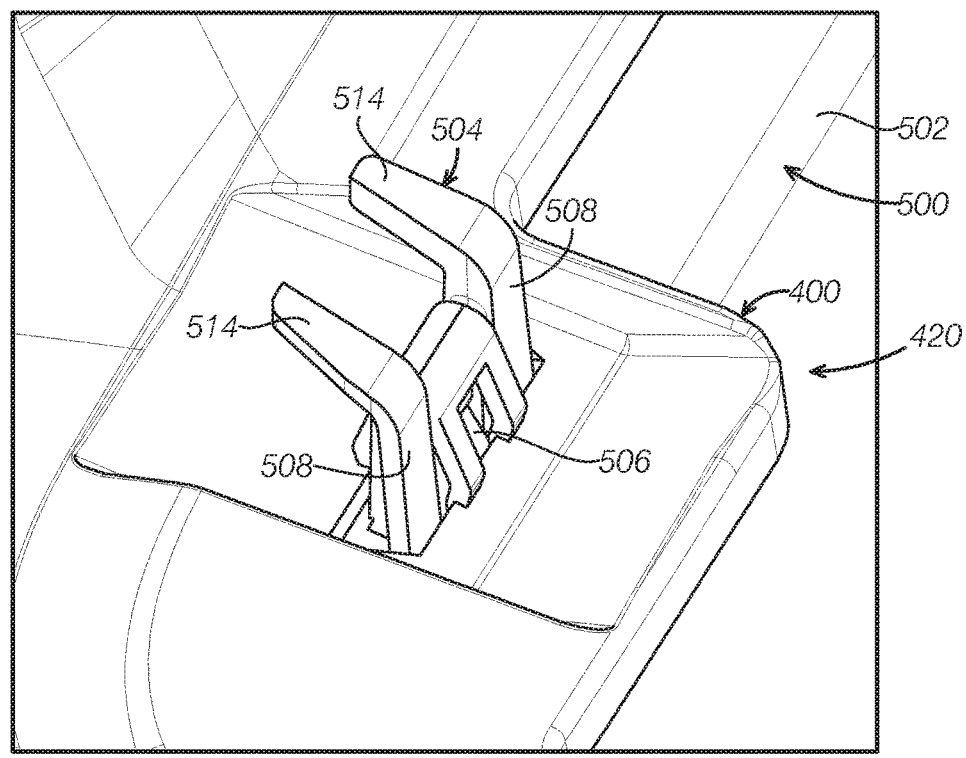
FIG. 7 is a perspective view of a part assembly according to one embodiment of the present disclosure.

FIG. 7 is a perspective view of a part assembly 420 including a child part 500 according to another embodiment of the present disclosure and the parent part 400 in FIG. 5, illustrate an assembled state. For the sake of brevity, the different features of the child part 500 is described in detail. The child part 500 includes a main panel 502, and a clip tower 504 The clip tower 504 includes a bracket 506 and two pillars 508 that sandwiches the bracket 506 in-between. The clip tower 504 further includes a retention member 514 extending from the pillars 508 and form an angle to the main panel 502 of the child part 500. In the depicted embodiment, the retention member 514 includes two arms extending from the two pillars 508. The difference of the retention member 514 from the retention member 314 in FIGS. 2-4 and 6 is that the retention member 514 does not include a cross bar connecting the ends of the retention member. The main panel 502 and the clip tower 504 may be integrally formed. Alternatively, the retention member 514 may include one arm extending from one of the two pillars. Without the cross bar, the tooling to fabricate the child part 500 can be simpler.

It should be appreciated that the retention member may have any appropriate configuration such as a hook-like configuration which allow the clip tower to pass an assembling hole of a parent part in an insertion direction while being retained on the parent part when the clip tower is moved in a direction opposite the insertion direction.

Figure 8:
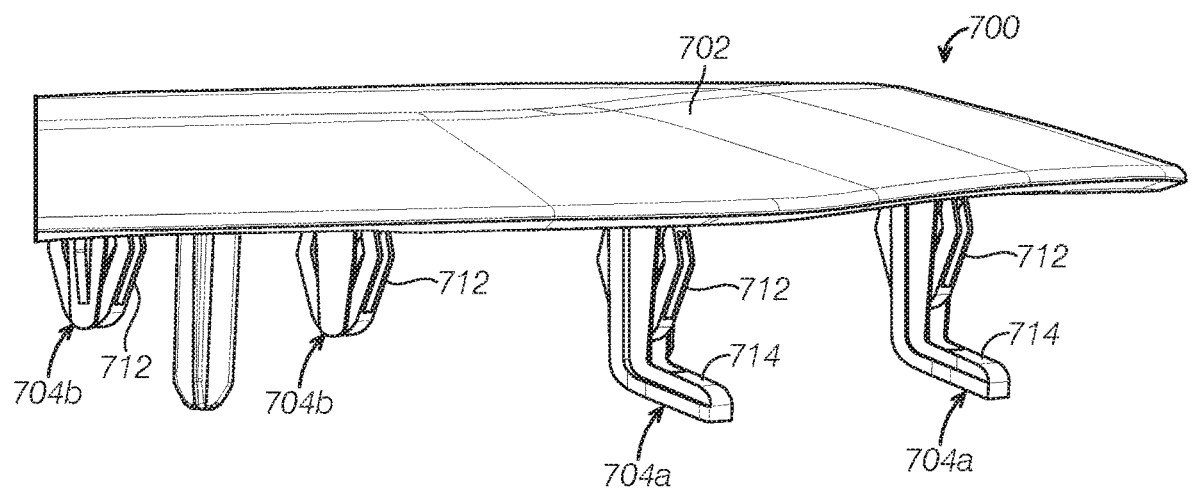
FIG. 8 is a perspective view of a child part according to one embodiment of the present disclosure.

FIG. 8 is a perspective view of a child part 700 according to one embodiment of the present disclosure. The child part 700 is connected to a parent part via a plurality of clips 712. The child part 700 includes a main panel 702 and a plurality of clip towers to hold the clips. In some embodiments, the plurality of clip towers may include a plurality of first clip towers 704a and a plurality of second clip tower 704b. The first clip tower 704a may include a retention member 714. The first clip tower 704a may have structure similar to the clip towers 304 and 504 described above. The plurality of first clip towers 704a may be located at the places wherein the main panel 702 can be retained effectively. For example, one first clip tower 704a may be located at an edge portion and another first clip tower 704a may be located at an opposite edge portion of the main panel 702. In another example, the plurality of clip towers include three first clip towers 704a each having a retention member 714 and the three retention points constitute a stable plane. The second clip towers 704b may not include the retention members. Alternatively, each of the plurality of clip towers of the child part may include a retention member. In some embodiment, all retention members 714 of the child part 700 may be angled toward substantially the same direction such that the child part 700 can be inserted into the plurality of assembling holes on the parent part easily.

The retention member of the child panel of the present disclosure functions as a secondary retention when a high load is applied to the part or an additional level of the retention is needed. As such, additional fasteners such as screw/screw boss and nut/bolt does not need to be added to provide the additional retention, which save the cost and simplifies the assembling process.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A part assembly, comprising:
a parent part including an assembly hole; and
a child part comprising:
a main panel, a clip tower on a surface of the main panel, wherein the clip tower includes a base to hold a clip and a retention member extending from the base at a direction away from the main panel and bending to form a sloped portion with an angle to the surface of the main panel, wherein the retention member extends from a top of the base, and the retention member and the base are formed as a single piece, and a clip snapped and preassembled on the base of the clip tower;

wherein the clip is configured to deform to pass the assembling hole of the parent part and restore to its normal state after passing the assembling hole to connect the child part to the parent part.

2. The part assembly of claim 1, wherein the base further includes two pillars and a bracket between the pillars and is configured to hold the clip and wherein the retention member extends from the pillars and the angle to the surface of the main panel is less than 90 degrees.

3. The part assembly of claim 1, wherein the retention member is sized such that it can be inserted into the assembling hole of the parent part and allow the clip to pass through the assembling hole at an insertion direction while it can be only separated from the parent part by a rotation and then translation at the direction opposing the insertion direction.

4. The part assembly of claim 1, wherein the main panel, the base and the retention member are integrally formed.

5. A part assembly, comprising:
a parent part including an assembling hole; and
a child part including:
  a main panel,
  a clip tower disposed on a surface of the main panel, and
  a clip snapped on the clip tower,
  wherein the clip tower includes a bracket disposed between two pillars, and a retention member, wherein the retention member includes two sloped portions extending from the two pillars, respectively and bending to form an angle with a plane substantially parallel to the main panel of the child part,
wherein the clip is configured to deform to pass the assembling hole of the parent part and restore to its normal state after passing the assembling hole to connect the child part to the parent part.

6. The part assembly of claim 5, wherein the angle of the retention member to the plane substantially parallel to the main panel of the child part is less than 90 degrees.

7. The part assembly of claim 6, wherein the retention member further includes a crossbar connecting two ends of the sloped portions.

8. The part assembly of claim 5, wherein a projection of a width of the retention member at its extension direction from the pillars on the main panel is greater than a width of the assembling hole.

9. The part assembly of claim 5, wherein the child part includes a plurality of clip towers, and wherein selected clip towers are configured to have retention members, and the retention members are sloped substantially at the same direction.

10. The part assembly of claim 5, wherein the child part includes a plurality of clip towers, and wherein each of the clip towers includes the retention member, and retention members of the plurality of clip towers are sloped substantially at the same direction.

11. The part assembly of claim 5, wherein the child part is made from plastic, metal, carbon fiber, carbon-fiber-reinforced polymer or composite.

12. The part assembly of claim 5, wherein the main panel and the clip tower of the child part are made from plastic material and integrally formed in an injection molding.

* * * * *